Nov. 16, 1926.
G. M. KELLER
1,607,002
ELECTRIC MOTOR CONTROL SYSTEM
Filed Feb. 21, 1925     4 Sheets-Sheet 1
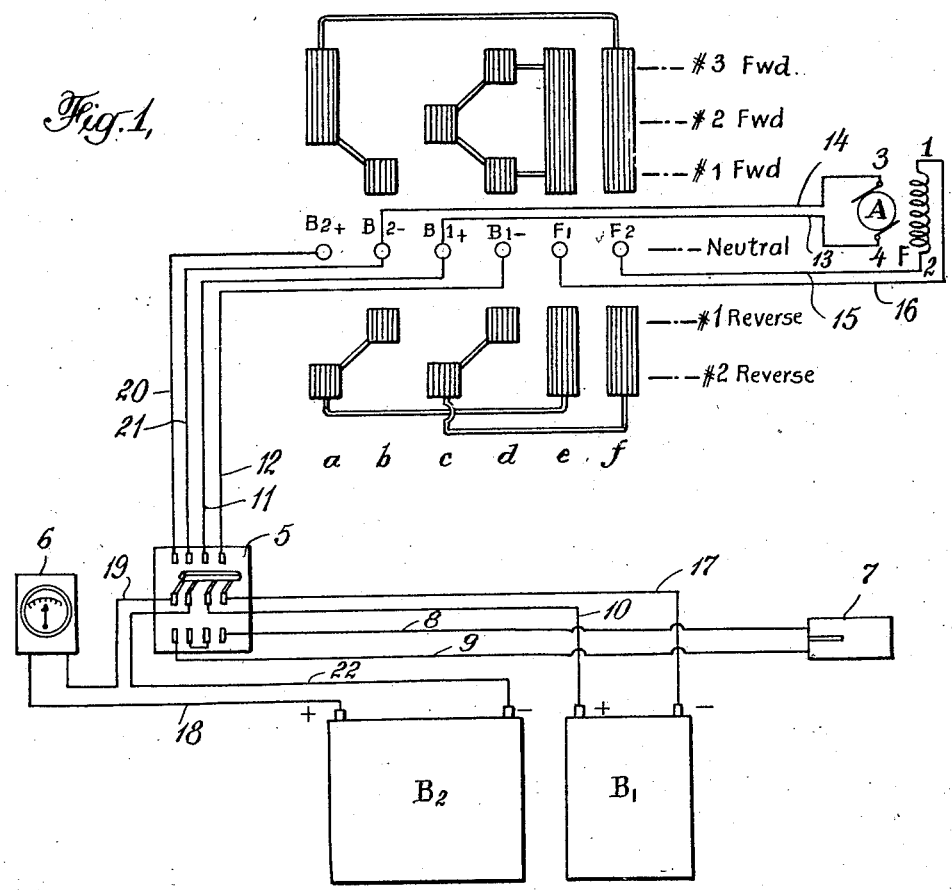
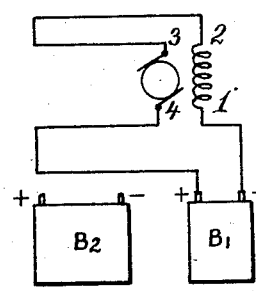
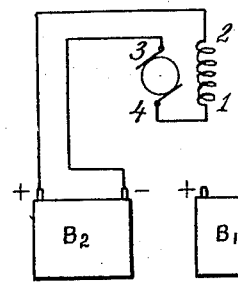
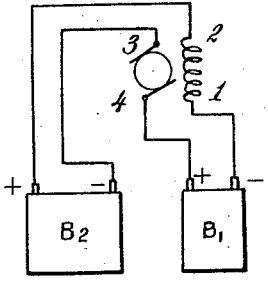
INVENTOR
Geo. M. Keller
BY
ATTORNEY

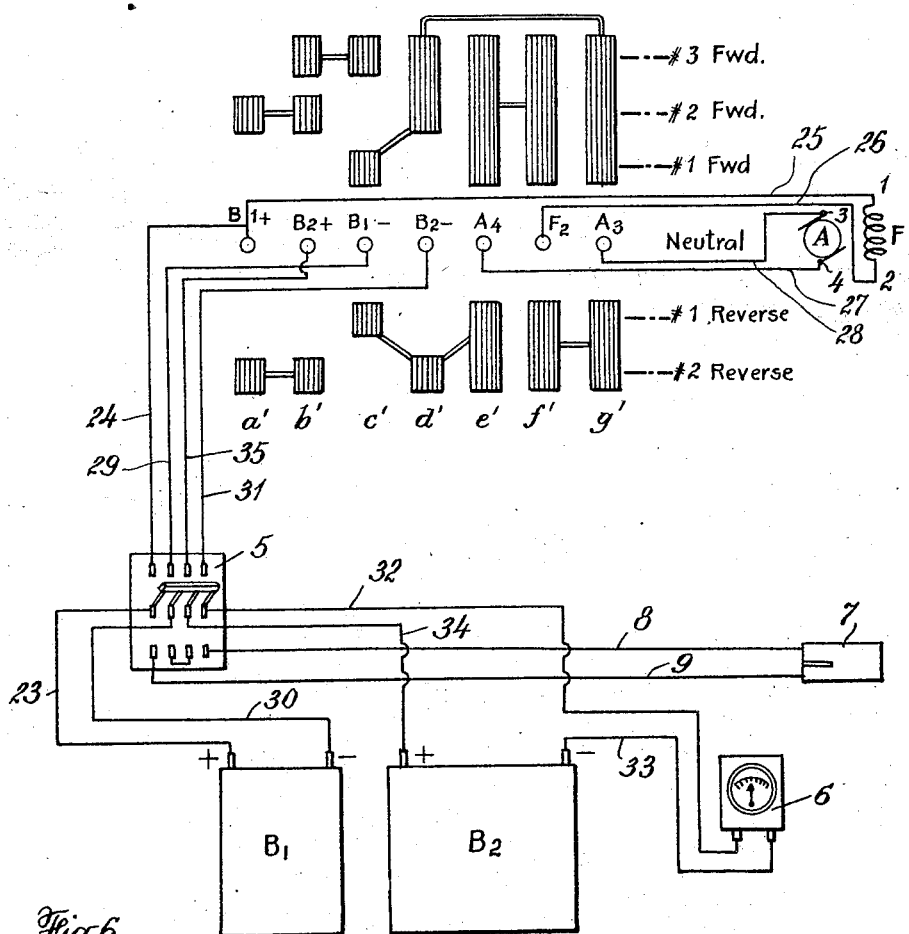
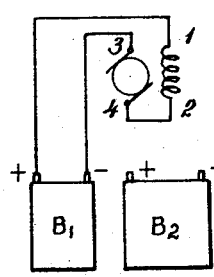
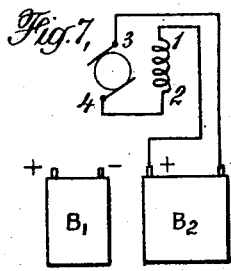
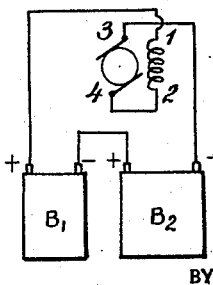

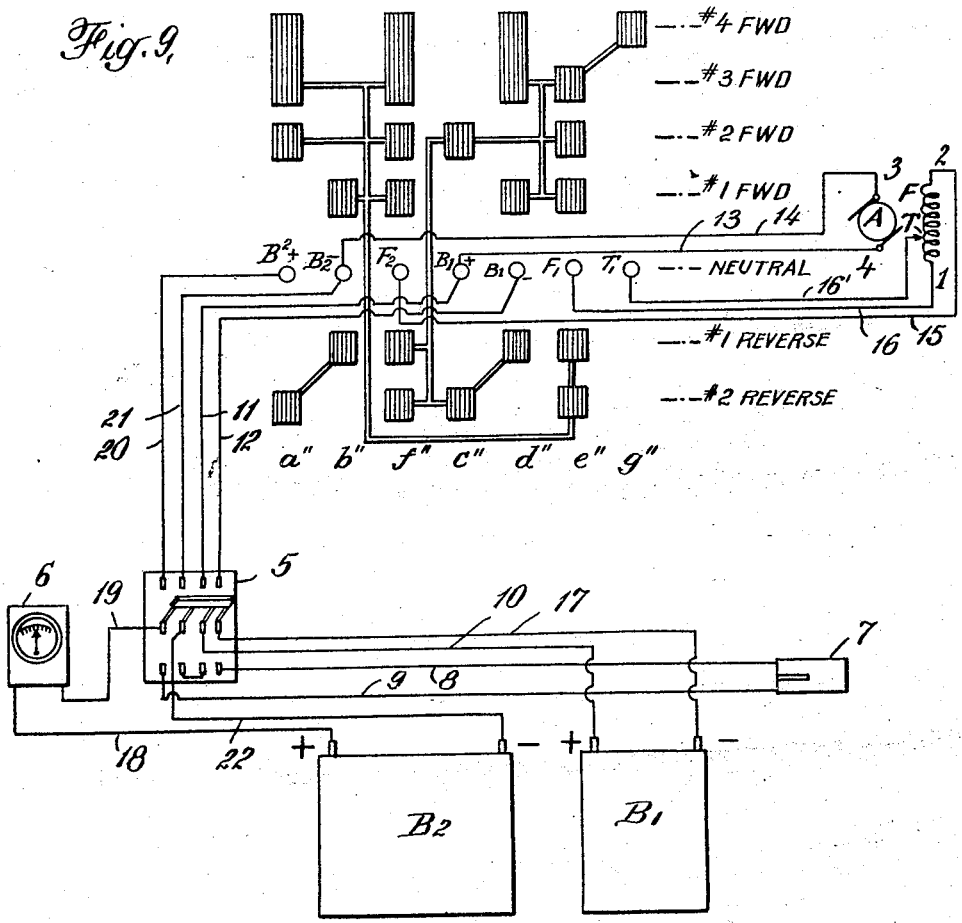

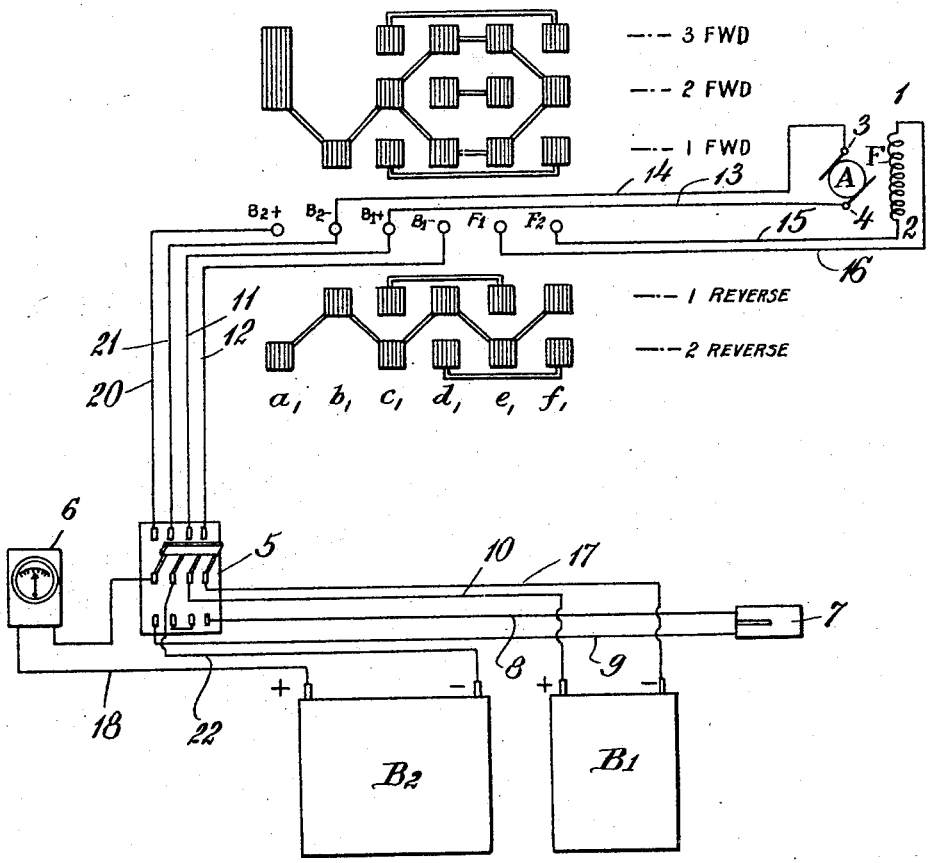

Patented Nov. 16, 1926.

1,607,002

UNITED STATES PATENT OFFICE.

GEORGE M. KELLER, OF BALTIMORE, MARYLAND.

ELECTRIC-MOTOR-CONTROL SYSTEM.

Application filed February 21, 1925. Serial No. 10,790.

This invention relates to an improved control system for electric motors and more particularly to an improved controller system for electric vehicles. The principal object of my invention is to provide a controller system in which the controller proper has a minimum number of contacts, and a system which is more efficient from the standpoint of energy consumption than the systems heretofore employed.

In general, the control systems used in connection with electric vehicles are quite complicated because of the multiplicity of electrical connections required, and quite inefficient except when the vehicle is running at maximum speed. One of the control systems now in general use consists of a battery divided into two equal parts and connected to a controller which serves to connect the two parts of the battery to the motor in parallel through a resistance. The resistance is gradually cut out until the two sections of the battery, connected in parallel, are directly across the motor terminals. Then the two sections of the battery are connected in series, with a resistance interposed between the battery and the motor. When this resistance is cut out, the full voltage of the two sections in series is applied to the motor. This system and other equivalent systems necessarily require the use of a multiplicity of connections and the energy consumed in the resistance elements is of course lost. The controller required for the purpose of making the necessary changes in connections is complicated to the extent that it must have a large number of contact fingers.

My invention makes it possible to eliminate the resistance elements without in any way injuring the motor or producing any undesirable effects on the operation of the vehicle. My invention also makes it possible to reduce the number of contacts on the controller proper, thus reducing the manufacturing cost of the controller, and also the maintenance costs. In general, I accomplish these results by providing two battery sections of unequal voltage, the voltage of one section being preferably twice that of the other. One method of connecting the battery sections to the motor may be described as follows:

The smaller section is first connected across the motor, the windings of which are in series, then the larger section alone is connected to the motor terminals, and finally both sections of the battery are connected to the motor so that both windings of the motor and both sections of the battery are in series. This produces three speeds forward and the changes in connections to advance from one speed to the next do not result in supplying excessive current to the motor.

An added advantage of considerable importance can be gained by constructing the controller so that when the controller is in the position to connect both battery sections to the motor, one winding of the motor is directly connected to the positive terminal of one of the battery sections and to the negative terminal of the other battery section. This makes it possible to eliminate one of the controller fingers so that for three speeds forward and two reverse, only six controller fingers are required.

My invention can be best understood by considering the following detailed description which is to be taken in conjunction with the accompanying drawings, in which—

Figure 1 is a circuit and controller diagram showing one embodiment of my invention.

Figures 2, 3 and 4 are circuit diagrams showing the manner in which the battery sections are connected to the motor for each of three forward speeds.

Figure 5 is a circuit and controller diagram of another embodiment of my invention.

Figures 6, 7 and 8 are diagrams showing the manner in which the battery sections are connected to the motor by the controller shown in Figure 5.

Figure 9 is a circuit and controller diagram of still another embodiment of my invention, and Figure 10 is a circuit and controller diagram of a further embodiment of my invention.

In Figure 1, I have shown a motor having an armature winding A and a field winding F, the terminals of the field winding being designated 1 and 2 and those of the armature winding 3 and 4. The terminals of the field winding are shown connected to contacts $F_1$ and $F_2$ of a controller and the terminals 3 and 4 of the armature winding are connected to contacts designated $B_{2-}$ and $B_{1+}$. The battery which supplies current to the motor windings is shown in two sections, $B_1$ and $B_2$. The battery may consist of a single group of cells, or it may consist of two separate groups as will be readily understood. I prefer to have the larger battery section $B_2$ of such size relative to the smaller section that the voltage of the former is substantially twice that of the latter. For example, the battery section $B_2$ may consist of 28 cells having a total voltage of 56 and $B_1$ may consist of 14 cells having a total voltage of 28. The larger battery section $B_2$ is shown connected to a switch 5 which is of the 4 pole double throw type. The positive terminal of the larger battery section $B_2$ is shown connected to the switch 5 through an ampere hour meter 6. When the switch 5 is closed so as to connect the battery sections to the controller, the positive terminal of battery section $B_2$ is connected to a controller contact designated $B_{2+}$ and the negative terminal is connected to contact designated $B_{2-}$. The smaller battery section $B_1$ is likewise connected to contacts $B_{1+}$ and $B_{1-}$ of the controller.

When the switch 5 is closed in the direction opposite to that above mentioned, it serves to connect the battery sections $B_1$ and $B_2$ to a charging receptacle 7 connected to the switch by leads 8 and 9. This provides a means for charging the two battery sections as a unit.

The controller shown in Figure 1 consists of the contacts above mentioned and a plurality of contact fingers designated $a$, $b$, $c$, $d$, $e$ and $f$. These contact fingers are arranged to provide three sets of connections for three forward speeds and two sets of connections for reverse speeds, as well as a neutral position.

When the contacts $B_{2+}$ to $F_2$ of the controller coincide with the contact fingers in the first forward position, it will be noted that the small battery section $B_1$ is connected to the motor windings, these windings being in series. The circuit is then as follows:

The positive terminal of $B_1$, lead 10, switch 5, lead 11, contact $B_{1+}$, lead 13, armature terminal 4, armature terminal 3, lead 14, contact $B_{2-}$, contact finger $b$, contact finger $f$, contact $F_2$, lead 15, field terminal 2, field terminal 1, lead 16, contact $F_1$, contact finger $e$, contact finger $d$, contact $B_{1-}$, lead 12, switch 5 and lead 17 back to the negative terminal of battery $B_1$. In other words, the battery section $B_1$ is connected to terminals 1 and 4 of the motor windings as shown in Figure 2, the larger battery section being entirely disconnected from the motor. The voltage of the smaller section is less than that of one section of the ordinary controller system in which the battery is split in two equal parts and accordingly no resistance is required. Of course, the operation of the controller could be made more smooth by employing resistance units which are gradually cut out but the operation of the system has been found to be quite satisfactory where no such resistance units are employed.

In the second forward position of the controller, the large battery section $B_2$, is connected across terminals 2 and 3 of the motor as shown in Figure 3, the smaller battery section being entirely disconnected from the motor. It will be noted that while the larger battery is connected to terminals 2 and 3 of the motor instead of to terminals 1 and 4, as was the case in the first forward position, yet the current flows through the motor windings in the same direction. The circuit for the second forward position is as follows.

The positive terminal of $B_2$, lead 18, ampere hour meter 6, lead 19, switch 5, lead 20, contact $B_{2+}$, contact finger $a$, contact finger $f$, contact $F_2$, lead 15, field terminal 2, field terminal 1, lead 16, contact $F_1$, contact finger $e$, contact finger $c$, contact $B_{1+}$, lead 13, armature terminal 4, armature terminal 3, lead 14, contact $B_{2-}$, lead 21, switch 5 and lead 22 back to the negative terminal of $B_2$. In the second forward position the full voltage of the larger battery section $B_2$ is applied to the motor windings. This voltage is substantially twice that of the smaller section, sufficient to cause the motor to increase its speed, but it is not high enough to injure the motor because it represents only two-thirds of the full voltage of the entire battery.

As the controller is moved from the second forward position to the third forward position, the larger battery section $B_2$ remains connected to terminals 2 and 3 of the motor as shown in Figure 4, and in addition the smaller battery section $B_1$ is connected to the motor terminals 1 and 4. Thus in effect, the third forward position is a combination of the first and second positions as will be readily appreciated upon referring to Figures 2, 3 and 4. The circuit for the third forward position is as follows:

Positive terminal of $B_2$, lead 18, meter 6, lead 19, switch 5, lead 20, contact $B_{2+}$, contact finger $a$, contact finger $f$, contact $F_2$, lead 15, field terminal 2, field terminal 1, lead 16, contact $F_1$, contact finger $e$, contact finger $d$, contact $B_{1-}$, lead 12, switch 5, lead 17, negative terminal of $B_1$, positive terminal of $B_1$, lead 10, switch 5, lead 11, contact $B_{1+}$, lead 13, armature terminal 4, armature terminal 3, lead 14, contact $B_{2-}$, lead 21, switch 5, and lead 22 back to the negative terminal of battery section $B_2$.

In the third forward position the battery sections $B_1$ and $B_2$ and the motor windings are all connected in series but it will be noted that the battery sections are not directly connected to each other. It is this feature of the system which makes it possible to use only six contact fingers $a$ to $f$ inclusive. If the battery sections were to be connected in series in the usual manner, then the system would be like that shown in Figure 5.

The two reverse positions shown in Figure 1 serve to connect first the small battery section $B_1$ to the motor terminals and then the larger battery section $B_2$ to these terminals and it will be noted that in these reverse positions the terminals of the field windings are in effect reversed, thus affecting the reversal of the motor. It is not deemed necessary to describe the circuit for each of these reverse positions because they can be readily followed through on the diagram after the manner described in connection with the three forward positions. It is of course to be understood that the armature terminals 3 and 4 could be connected to contacts $F_1$ and $F_2$ and the field terminals 1 and 2 to contacts $B_{2-}$ and $B_{1+}$ without affecting the operation of the system. Where the armature and field terminals are thus interchanged, the reversing is effected by reversing the armature current instead of the field current as will be readily understood.

The embodiment of my invention shown in Figure 5 comprises means for first connecting the smaller battery section $B_1$ to the motor as shown in Figure 6, then connecting the larger battery section to the motor as shown in Figure 7 and then connecting both battery sections to the motor as shown in Figure 8. It will be noted that Figures 6 and 7 are substantially the same as Figures 2 and 3, whereas there is a difference between Figures 4 and 8. In Figure 4 it will be noted that the two battery sections are not directly connected together, while in Figure 8 the negative terminal of section $B_1$ is connected directly to the positive terminal of $B_2$. In both cases, however, the battery sections are connected in series with the motor windings.

In Figure 5 the parts of the motor are designated by the same reference characters employed in Figure 1. The controller of Figure 5 comprises a set of seven contact fingers, designated $a'$, $b'$, $c'$, $d'$, $e'$, $f'$ and $g'$. These contact fingers are arranged and interconnected so that the connections shown in Figures 6 to 8 inclusive can be made by simply operating the controller. The circuit for the first forward position of the controller is as follows:

Positive terminal of $B_1$, lead 23, switch 5, lead 24, contact $B_{1+}$, lead 25, field terminal 1, field terminal 2, lead 26, contact $F_2$, contact finger $f'$, contact finger $e'$, contact $A_4$, lead 27, armature terminal 4, armature terminal 3, lead 28, contact $A_3$, contact finger $g'$, contact finger $c'$, contact $B_1-$, lead 29, switch 5 and lead 30 back to the negative terminal of battery section $B_1$. In like manner, the controller in the second forward position serves to connect the battery section $B_2$ to the motor with the positive terminal of the battery connected to field terminal 1 and with the negative terminal of the battery to armature terminal 3, the field terminal 2 and armature terminal 4 being interconnected between contact fingers $e'$ and $f'$. In the third forward position the positive terminal of battery section $B_1$ is connected to field terminal 1 and the negative terminal of battery section $B_2$ is connected to armature terminal 3. The negative terminal of battery section $B_1$ and the positive terminal of battery section $B_2$ are interconnected between contact fingers $b'$ and $c'$. The circuit for the third forward position is as follows:

Positive terminal of battery section $B_1$, lead 23, switch 5, lead 24, contact $B_{1+}$, lead 25, field terminal 1, field terminal 2, lead 26, controller contact $F_2$, contact finger $f'$, contact finger $e'$, controller contact $A_4$, lead 27, armature terminal 4, armature terminal 3, lead 28, controller contact $A_3$, contact finger $g'$, contact finger $d'$, controller contact $B^2_-$, lead 31, switch 5, lead 32, ampere hour meter 6, lead 33, negative terminal of battery section $B_2$, positive terminal of battery section $B_2$, lead 34, switch 5, lead 35, controller contact $B_{2+}$, contact finger $b'$, contact finger $c'$, controller contact $B_{1-}$, lead 29, switch 5, and lead 30 back to the negative terminal of battery section $B_1$.

The double throw switch 5 shown in Figure 5 is the same as that shown in Figure 1 and serves to either connect the battery sections to the controller or to the charging receptacle 7, as described in connection with Figure 1.

In Figure 9 the parts of the motor and the major portion of the controller system in general are designated by the same reference characters employed in Figure 1. The controller of Figure 5 comprises a set of 7 contact fingers designated $a''$, $b''$, $f''$, $c''$, $d''$, $e''$, and $g''$. These contact fingers are interconnected so that the connections shown in Figures 2 to 4 inclusive can be made by simply operating the controller. The controller is provided with an extra forward position which has the effect of weakening the field of the motor, thereby increasing the speed of the motor. This embodiment of the invention may be more desirable for some applications than the embodiments shown in the other figures of the drawing because of the fact that the other embodiments include only one running speed. The embodiment shown in Figure 9 is such that the two battery sections cannot readily be discharged at different rates. The fourth or "overrunning" speed can be operated in various ways. For example, the series field of the motor may be composed of 4 coils in series, plus 4 additional smaller coils mounted on the same pole pieces and connected with the main coils in such a way that three field leads coming from the motor will make it possible, through the use of controller fingers, to utilize the entire field wiring in series on the lower speeds, and only the main field coils on the fourth or "overrunning" speed. These coils could of course be in series parallel instead of all in series as just described. Furthermore, the fourth speed could be obtained by shunting part of the field current, by paralleling the field coils in pairs, or by tapping two of the field coils in such a way that to produce a strong field these two coils are energized to a point, say 35% higher than the others, and for a weak field, to a corresponding point lower than the others.

In Figure 9 in which I have illustrated a controller system having four forward speeds, the last of which is effected by passing the field current through only a portion of the field winding, the circuits for the first three forward positions of the controller are the same as those shown in Figure 1. The circuit for the fourth forward position is as follows:

Positive terminal of battery section $B_2$, lead 18, meter 6, lead 19, switch 5, lead 20, contact $B_{2+}$, contact finger $a''$, contact finger $f''$, contact $F_2$, lead 15, field terminal 2, field terminal T, lead 16', contact $T_1$, contact finger $g''$, contact finger $d''$, contact $B_{1-}$, lead 12, switch 5, lead 17, negative terminal of battery section $B_1$, positive terminal of $B_1$, lead 10, switch 5, lead 11, contact $B_{1+}$, lead 13, armature terminal 4, armature terminal 3, lead 14, contact $B_{2-}$, lead 21, switch 5 and lead 22 back to the negative terminal of battery $B_2$.

In Figure 10 the parts of the motor and the major portion of the controller system in general are designated by the same reference character as employed in Figure 1. The controller of Figure 10 comprises a set of 6 contact fingers designated $a_1$, $b_1$, $d_1$, $e_1$ and $f_1$. These contact fingers are interconnected so that all the necessary connections can be made by simply operating the controller. This system provides three forward speeds and two reverse speeds and is intended to be used with a motor of the shunt type. If the circuits for the various forward and reverse positions are traced through, it will be found that one of the battery sections ($B_1$ in the illustration given) is always connected across the field winding F, the variations in speed being secured by connecting the battery sections across the armature. In going forward, the order of connections is as follows. First the smaller battery section $B_1$ is connected across the armature terminals 3 and 4, then the larger battery section is connected across these terminals by itself and finally the two battery sections are connected in series and the group connected across the armature terminals 3 and 4.

The advantages of my invention can be appreciated by considering the fact that the improved system can be incorporated in an electric truck with the use of less than 20 feet of wire in the entire wiring system, exclusive of the motor leads, and the additional fact that there are never more than 4 contact fingers in contact on any one speed position, whereas in the ordinary type of controller there are always 6 or more contact fingers in use at once.

It is to be understood that various changes can be made without departing from the spirit of my invention which is not limited to the particular embodiments illustrated and described, but includes such modifications thereof as fall within the scope of the appended claims. For example, the field and armature terminals can be interchanged and the connections otherwise varied without sacrificing any of the advantages of the invention. My invention makes it possibe to eliminate the resistance elements heretofore employed and thereby to increase the efficiency of the system. It also makes it possible to employ a controller which is less expensive to manufacture and more reliable. The controller, especially the forms shown in Figures 1 and 9, consists of only a few parts and yet it provides an ample number of forward and reverse speeds. For some applications it may not be necessary to reverse the motor and where this is the case the controller can be further simplified. For example, if the reverse positions of the controller of Figure 5 are eliminated, contact fingers $e$ and $f$ can be combined as a single contact finger and the field lead 26 and the armature lead 27 can be connected to the same controller contact. Furthermore, the invention can be applied to various types of motors such as the well known series and shunt motors.

It is to be understood that where used in the specification and claims, the expression "connecting one battery section to the motor" is intended to include the case where the battery section is connected with the motor armature alone, or with the motor armature and either or both of the motor field windings in series with each other; and the expression "connecting both battery sections in series and with the motor", is intended to include the case where both battery sections are connected in series with each other and then in series with the motor armature alone and also the case where the two battery sections, the armature and either or both field windings are all connected in series with each other.

I claim:

1. An electric motor control system comprising the combination with an electric motor having an armature winding and a field winding, of two battery sections of unequal voltage, and a controller comprising means for connecting one battery section alone to the motor, means for connecting the other battery section alone to the motor and means for connecting both battery sections in series and with the motor, the said controller means being arranged and interconnected so that one winding of the motor is permanently connected between the positive terminal of one battery section and the negative terminal of the other battery section.

2. An electric motor control system comprising the combination with an electric motor, of two battery sections of unequal voltage each having a pair of terminals, and a controller comprising means for connecting the low voltage battery section alone to the motor, means for connecting the high voltage battery section alone to the motor, and means for connecting both terminals of both battery sections to the motor, the two battery sections being in series.

3. An electric motor control system comprising the combination with an electric motor having a field winding and an armature winding, of two battery sections of unequal voltage, and a controller comprising means for first connecting the low voltage battery section in series with the motor windings, and means for thereafter connecting the high voltage battery section in series with the motor windings.

4. An electric motor control system comprising the combination with an electric motor having a field winding and an armature winding, of two battery sections of unequal voltage, and a controller comprising means for first connecting the low voltage battery section in series with the motor windings, means for thereafter connecting the high voltage battery section in series with the motor windings, and means for finally connecting both battery sections and both motor windings all in series.

5. An electric motor control system comprising the combination with an electric motor having a field winding and an armature winding, of two battery sections of unequal voltage, and a controller comprising means for connecting both battery sections and both motor windings all in series with one motor winding connected to the positive terminal of one battery section and to the negative terminal of the other battery section.

6. An electric motor control system comprising the combination with an electric motor having a field winding and an armature winding, of two battery sections of unequal voltage, and a controller comprising means for first connecting the low voltage battery section in series with the motor windings, means for thereafter connecting the high voltage battery section in series with the motor windings, and means for finally connecting both battery sections and both motor windings all in series, with one motor winding connected to the positive terminal of one battery section and to the negative terminal of the other battery section.

7. An electric motor control system comprising the combination with an electric motor having a field winding and an armature winding, of two battery sections of unequal voltage, and a controller comprising a set of six contact fingers providing three forward speed positions, a neutral position, and two reverse speed positions, said contact fingers being arranged and interconnected so that in the first forward position the low voltage battery section is alone connected to the motor, in the second forward position the high voltage battery section is alone connected to the motor, in the third forward position both battery sections are connected in series with the motor, in the first reverse position the low voltage battery section is alone connected to the motor, and in the second reverse position the high voltage battery section is alone connected to the motor.

8. An electric motor control system comprising the combination with an electric motor having a field winding and an armature winding, of two battery sections of unequal voltage, and a controller comprising a set of six contact fingers providing three forward speed positions, a neutral position, and two reverse speed positions, said contact fingers being arranged and interconnected so that in the first forward position the low voltage battery section is alone connected to the motor, in the second forward position the high voltage battery section is alone connected to the motor, in the third forward position both battery sections are connected in series with the motor, with one motor winding connected to the positive terminal of one battery section and to the negative terminal of the other battery section.

9. An electric motor control system comprising the combination with on electric motor having a field winding and an armature winding, of two battery sections of unequal voltage, and a controller comprising means for first connecting the low voltage battery section in series with the motor windings, means for thereafter connecting the high voltage battery section in series with the motor windings, and means for finally connecting both battery sections and both motor windings all in series, with a portion only of the field winding connected to the positive terminal of one battery section and to the negative terminal of the other battery section.

10. An electric motor control system comprising the combination with an electric motor having a field winding and an armature winding, of two battery sections of unequal voltage, and a controller comprising a set of 7 contact fingers providing 4 forward speed positions, a neutral position, and two reverse speed positions, said contact fingers being arranged and interconnected so that in the first forward position the low voltage battery section is alone connected to the motor, in the second forward position the high voltage battery section is alone connected to the motor in the third forward position both battery sections are connected in series with the motor, in the fourth forward position both battery sections are connected in series with the motor with a portion only of the field winding connected to the positive terminal of one battery section and to the negative terminal of the other battery section, in the first reverse position the low voltage battery section is alone connected to the motor, and in the second reverse position the high voltage battery section is alone connected to the motor.

11. The method of operating an electric motor, which consists in first connecting the motor to the terminals of a low voltage source of electric current, then disconnecting the motor from this source of current and connecting the motor to the terminals of a second source of electric current having a voltage substantially higher than that of the first source, and finally connecting both terminals of each source of current to the motor with the two sources of current in series.

12. The method of operating an electric motor having an armature winding and a field winding, which consists in first connecting the motor to the terminals of a low voltage source of electric current, then disconnecting the motor from this source of current and connecting the motor to the terminals of a second source of electric current, having a voltage substantially higher than that of the first source, and finally connecting both terminals of each source of current to the motor with the two sources of current in series and with one winding of the motor connected to the positive terminal of one source of current and to the negative terminal of the other source of current.

13. The method of operating an electric motor having an armature winding and a field winding, which consists in first connecting the motor to a low voltage source of electric current, then disconnecting the motor from this source of current and connecting the motor to a second source of electric current, having a voltage substantially higher than that of the first source, and finally connecting the two sources of current to the motor in series so that each source of current is at the same time separately connected to both the field winding and the armature winding of the motor.

In testimony whereof I affix my signature.

GEORGE M. KELLER.